(12) United States Patent
Amadio et al.

(10) Patent No.: US 7,499,989 B2
(45) Date of Patent: Mar. 3, 2009

(54) INSTALLING DATA WITH SETTINGS

(75) Inventors: Louis Amadio, Sammamish, WA (US); Paul Erickson, Sammamish, WA (US); Oliver Fisher, Ottawa (CA); Keira Amos, Seattle, WA (US); David Streams, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 536 days.

(21) Appl. No.: 11/206,096

(22) Filed: Aug. 18, 2005

(65) Prior Publication Data

US 2007/0043839 A1 Feb. 22, 2007

(51) Int. Cl.
*G06F 15/16* (2006.01)
(52) U.S. Cl. ...................... 709/222; 715/778
(58) Field of Classification Search ......... 709/200–203, 709/217–227; 715/847, 851, 778–779; 345/1.1, 345/2.2
See application file for complete search history.

(56) References Cited

U.S. PATENT DOCUMENTS

| | | | |
|---|---|---|---|
| 5,129,052 A | | 7/1992 | Barker et al. |
| 5,715,413 A | * | 2/1998 | Ishai et al. ............ 715/825 |
| 5,819,055 A | | 10/1998 | MacLean et al. |
| 5,937,417 A | | 8/1999 | Nielsen |
| 6,029,175 A | | 2/2000 | Chow et al. |
| 6,031,530 A | | 2/2000 | Trueblood |
| 6,057,834 A | * | 5/2000 | Pickover ............ 715/846 |
| 6,259,461 B1 | | 7/2001 | Brown |
| 6,311,221 B1 | | 10/2001 | Raz et al. |
| 6,353,451 B1 | | 3/2002 | Teibel et al. |
| 6,693,652 B1 | | 2/2004 | Barrus et al. |
| 6,928,620 B1 | * | 8/2005 | Crangle et al. ........... 715/769 |
| 7,019,743 B1 | * | 3/2006 | Wainwright et al. ...... 345/420 |
| 7,159,186 B2 | * | 1/2007 | Mattila et al. ............. 715/769 |
| 7,325,204 B2 | | 1/2008 | Rogers |
| 2002/0008719 A1 | * | 1/2002 | Miyawaki et al. ......... 345/764 |
| 2002/0080170 A1 | | 6/2002 | Goldberg et al. |
| 2002/0135621 A1 | | 9/2002 | Angiulo et al. |
| 2002/0161837 A1 | | 10/2002 | Sasaki et al. |
| 2004/0212640 A1 | | 10/2004 | Mann et al. |
| 2004/0261037 A1 | | 12/2004 | Ording et al. |
| 2005/0060664 A1 | | 3/2005 | Rogers |
| 2005/0125739 A1 | | 6/2005 | Thompson et al. |
| 2006/0010394 A1 | | 1/2006 | Chaudhri et al. |

OTHER PUBLICATIONS

Corporate Portals Letter, vol. 1, No. 10, Oct. 2000, 3 pages.

Snippets Product Overview. Downloaded from www.snippets.com Jun. 11, 2001.

Printout of representative pages from www.snippets.com website: Jun. 11, 2001.

(Continued)

*Primary Examiner*—Moustafa M Meky
(74) *Attorney, Agent, or Firm*—Senniger Powers LLP (57) ABSTRACT

The present invention relates to a system and method for displaying information, such as a gadget or a part and for dragging and dropping the part from a web page onto a separate location on a display such that the part is instantiated at the separate location and configured based on setting information contained within a representation of the part. Data associated with the part can be downloaded from a remote site.

20 Claims, 10 Drawing Sheets

OTHER PUBLICATIONS

Printout of representative pages from www.infogate.com website: Jun. 11, 2001.

The Octopus Platform. Downloaded from www.octopus.com Jun. 11, 2001.

Multiplying enterprise Application ROI, An Octopus Whitepaper. Apr. 2001, Downloaded from www.octopus.com Jun. 11, 2001.

Printout of representative pages from www.dodots.com website: Jun. 11, 2001.

Printout of representative pages from www.enfish.com website: Jun. 11, 2001.

S. Parsowith, et al. "Tickertape: Notification and Communication in a Single Line". Publication date unknown.

N. Marmasse. "Commotion: a context-aware communication system". In Proceedings of CHI, 1999.

S. Greenberg and M. Rounding, "The Notification Collage: Posting Information to Public and Personal displays", Yellow Series Report 2000-667-19, Department of Computer Science, University of Calgary, Alberta, Canada. Publication date unknown.

BotKnowledge, "InfoGate Review", 2000. "www.botknowledge.com/infogatereview.html", 1 page.

Konfabulator, Version 2.1.1., Aug. 3, 2005 at www.konfabulator.com, downloaded Nov. 15, 2005.

* cited by examiner

INSTALLING DATA WITH SETTINGS

BACKGROUND

The Internet is a ubiquitous source of information for computer users. Typically, a web page is displayed on a display and provides information for the user within defined page boundaries. However, the display of information on a display from web pages can be limited by the amount of space available on the display. For example, a user may desire up-to-the-minute information on weather conditions in any number of locations, sports scores of one or more sports events, stock information, or any other type of information. However, users often run out of space on the display to accommodate all of the information desired. In such a situation, a user would close windows or minimize windows thereby losing immediate and convenient access to the information. The result would be loss of pertinent, up-to-the-minute information desired by the user.

To regain access to the information, the user would have to open the web browser again. If the window had been minimized to allow additional space for other applications, the user would still have to restore or maximize the window. As a result, the user would have to interrupt his/her regular computer activities to obtain the desired information. Thus, the user would experience great frustration at having little to no control over how the desired information is displayed resulting in interruption of work.

Some applications permit information to be provided on a computer desktop through the execution of scripts. However, there is currently no effective method or system for a computer user to easily and efficiently obtain information, including contextual information from a web page, at a persisted location on a computer display and to control its display.

Thus, there exists a need in the art for a system and method for providing access to information in an adjustable way in which the information is both easily and conveniently accessible to the user and conveniently arranged in an orderly fashion on the display according to the user's preferences.

SUMMARY

According to an illustrative aspect, a method and system is provided for providing information in a web page on a computer desktop. The information in the web page can include a location or address to files or scripts associated with desired information. The location or address can be represented on the web page as a representation of the location or address.

In another illustrative aspect, a user can select the representation of the location or address on the web page and drag the representation away from the web page to a designated location on the computer desktop such as the desktop itself or a sidebar.

In another illustrative aspect, a user can drag the representation of the location or address from a web page and drop the representation into a sidebar on a computer desktop. The user can also download files or script associated with the desired information from a remote location, such as a server.

In another illustrative aspect, the computer system instantiates the desired information in a sidebar or on the desktop in a configuration determined by settings or configuration settings. The settings can be obtained from the representation.

DETAILED DESCRIPTION

Figure 1:
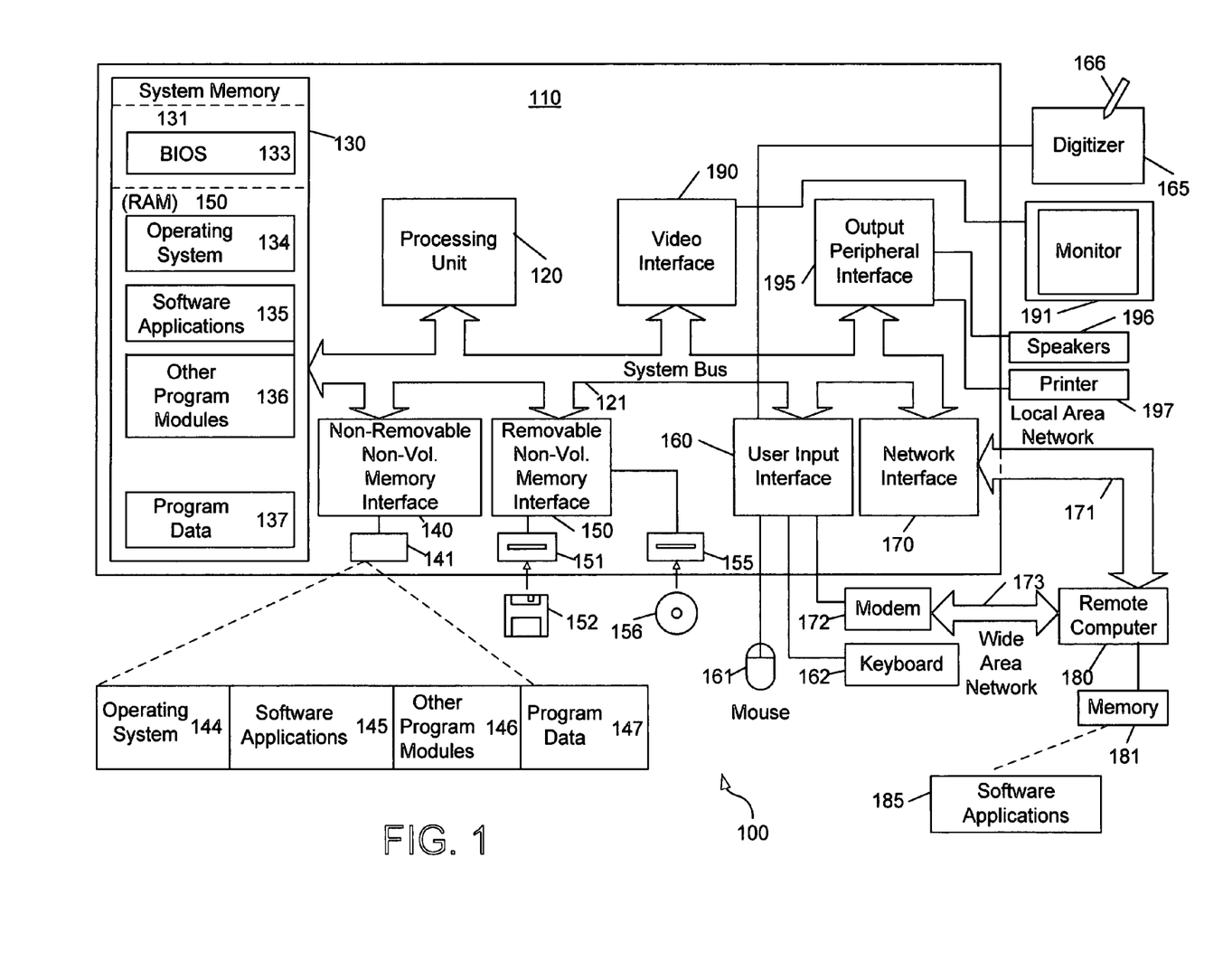
FIG. 1 illustrates an example of a system for implementing various features which includes a general purpose computing device in the form of a computer.

Examples provided herein may be implemented in a variety of operating environments. FIG. 1 illustrates an example of a suitable operating environment 100 in which aspects may be implemented. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

FIG. 1 illustrates an example of one suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Various aspects are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 1, an illustrative system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media includes both volatile and nonvolatile media, removable and non-removable media. By way of example, and not limitation, computer readable media may comprise computer storage media and communication media and includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In one example, a user may access information displayed in a window on a computer display and move the accessed information to an alternate location. The information may be transferred from the first location to a second location while downloading files associated with the information from a remote computer, such as a server. The information associated with the downloaded files can be displayed at the second location. For example, the first location may be a location such as a window in a remote execution environment. Examples of such a remote execution environment may include but are not limited to a web browser, a Terminal Services Desktop or a Virtual PC Desktop. In one example, the first location is a web page in a web browser. In this example, the second location may be at a location away from the web page or web browser such as on the desktop or within another application. At the second or alternate location, the information can be displayed and updated as needed. To the extent that the information is displayed, the information is persistent on the display even though the information may also be updated. This second or alternate location is sometimes referred to as a "persisted location."

Figure 4:
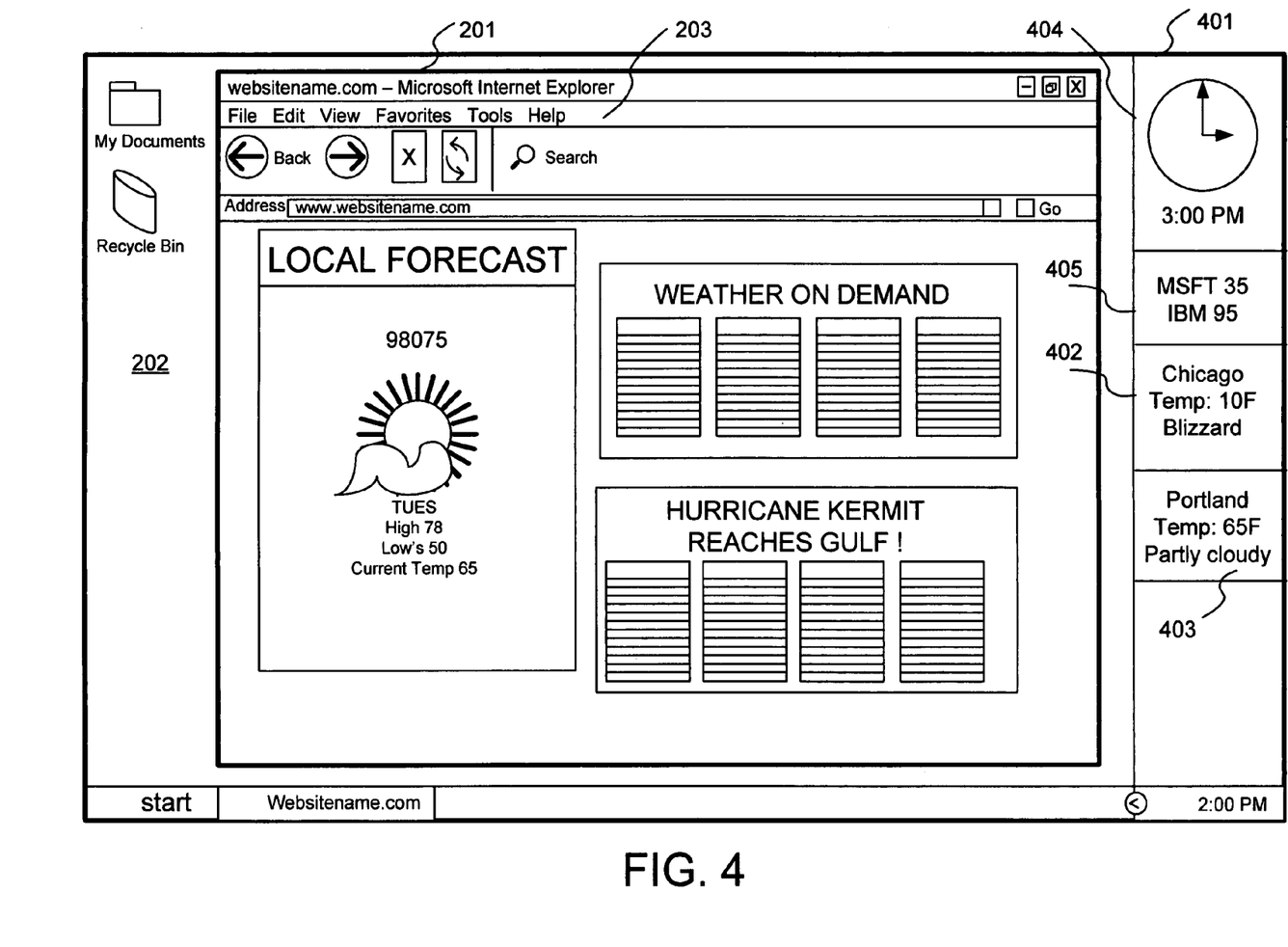
FIG. 4 illustrates an example of information being displayed on a sidebar on a computer desktop.

In one example, the persisted location is a sidebar on a computer desktop. FIG. 4 illustrates an example of a sidebar 401 displayed on a computer desktop 202. The sidebar can be of any shape or configuration and can be situated at any location on the computer desktop. In this example, the sidebar 401 is illustrated in FIG. 4 as a vertical rectangular bar on the right side of the computer display 202. The sidebar 401 persists on the desktop and can contain displays of other information. In this example, the sidebar 401 displays time information 404, stock quote information 405, weather in Chicago 402 and weather in Portland 403.

Figure 2:
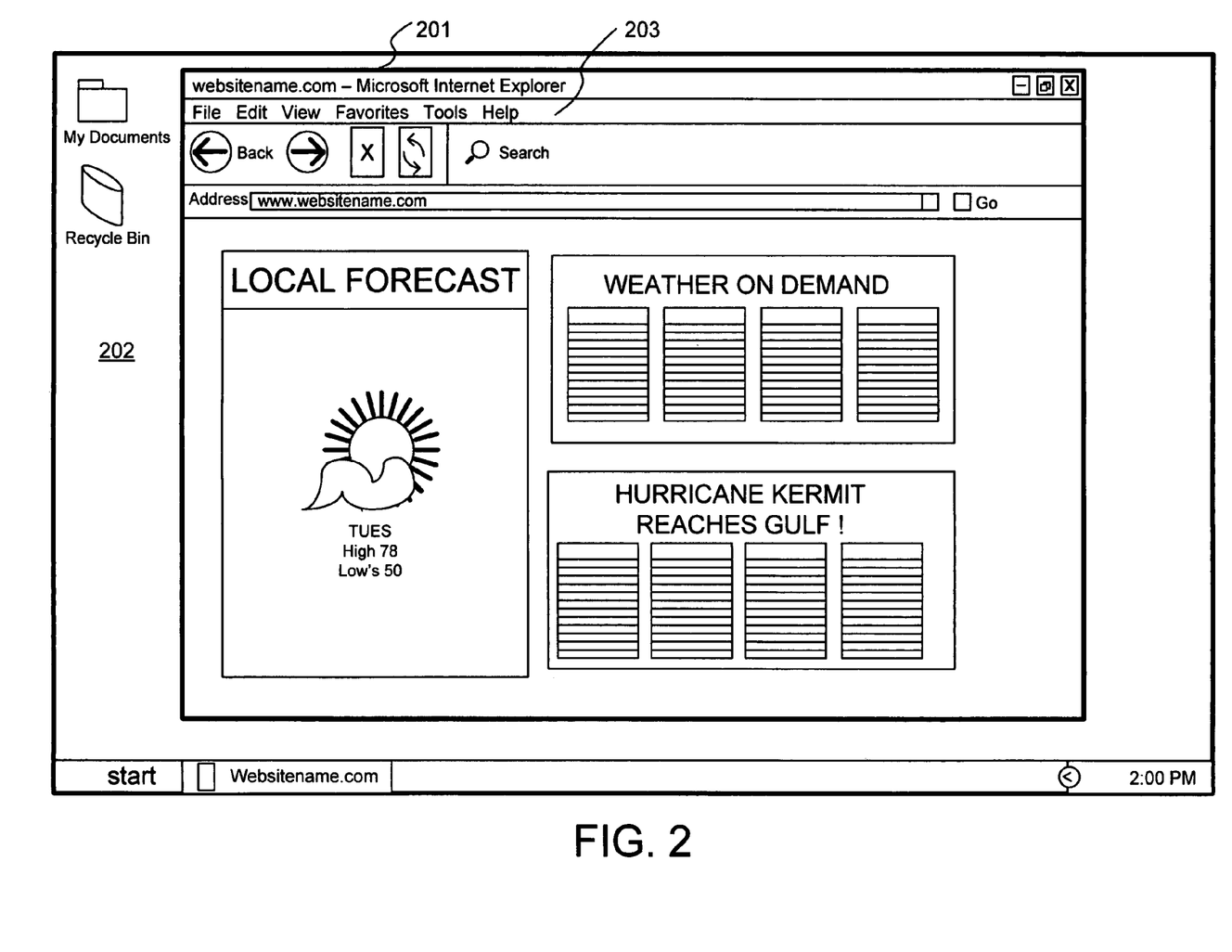
FIG. 2 illustrates an example of one aspect in which information is displayed in a web browser on a computer desktop.

FIG. 2 illustrates an example of one aspect in which information is displayed on a computer desktop. In this example, a computer displays a web page in a window 201 on a computer desktop 202 providing information on weather conditions. The window 201 has a menu 203, which can be situated across the top of the window 201, for performing actions with the associated web page.

A user may desire to move pertinent information from the window 201 associated with the web site to another location on the display. For example, if the user wishes to open another window of another application, that other window may interfere with the display of the desired information on the window 201 of the web site. In this case, the information on the window 201 of the web site would be unavailable to the user.

Figure 3:
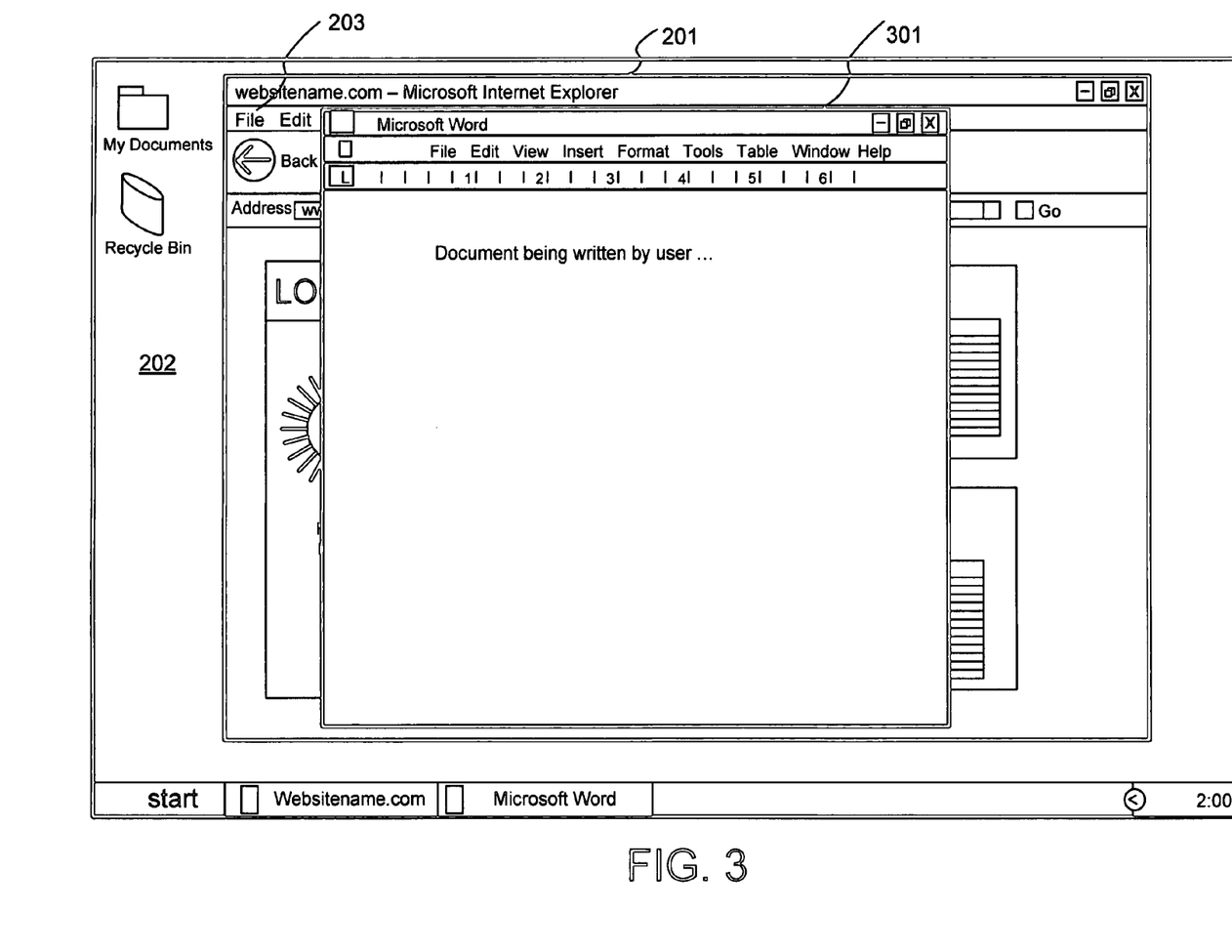
FIG. 3 illustrates an example of the display of a window of an application that interferes with the display of the information on the window of the web browser of FIG. 2.

FIG. 3 illustrates an example of the display of a window of an application that interferes with the display of the information in window 201 of the web site. In FIG. 3, a word processing application displays a window 361 of a document on the computer desktop 202 of a display. However, the word processing application window 301 obscures the desired information on the window 201 of the web site. Hence, while the user is working on the word processing application (i.e., working in the window 301), the user does not have ongoing access to the information provided in the window 201 of the web site. For example, if weather information is provided in the window 201 of the web site, the user will likely not be informed of any changes in weather conditions while the user is working on the word processing document 301.

In one example, a system downloads files and computer code associated with desired information from a web site to a local destination. This information can be stored and displayed locally at a designated location. When displayed, the information may be displayed at a predetermined location on the display or on the desktop. FIG. 4 illustrates an example of displaying information on a sidebar 401 on a computer desktop 202 (i.e., a predetermined location on the display). The sidebar 401 is illustrated as a rectangular area located at the right vertical side of the computer desktop 202, however, the sidebar 401 can be located at any location on the display 202 and can be of any shape. For illustration purposes only, the sidebar 401 is shown to include the time 404, current stock information of selected securities 405 and weather conditions in Chicago 402 and Portland 403.

The information displayed in the sidebar 401 can be obtained by downloading information associated with a web site or any remote execution environment (e.g., a web browser, a Terminal Services Desktop or a Virtual PC Desktop, to name a few). The information may include image files or data such as scripts, ZIP files or CAB files, for example, for producing the display or a visual representation of the desire information. This displayed information is sometimes referred to as a "gadget," "widget" or a "part." The part (or gadget or widget) includes computer files that constitute a package. In this example of the present invention, the package (i.e., the files associated with a web page) can be downloaded to a sidebar 401 at a local computer or client computer. Alternatively, the part can be downloaded to the computer desktop or into any other application.

The part may also include information specific to a specific user, location or other attribute. For example, the information may include preference information of a user such that a user can download specific desired information or display the data. This specific information is sometimes referred to as a "setting." The setting(s) can be associated with the package of certain desired information but can also be external to the package. For example, the part can store the setting(s) at a location separate from the package. In the example illustrated in FIG. 4, the setting(s) can provide information of the part to display specific local information such as the local time 404, stock quotes 405 of desired securities (MSFT and IBM in this example) or weather conditions 402, 403 in a specific city (Chicago, in this example).

In addition, there can be multiple instances of a part displayed on a computer display. In this example, one part associated with one setting may be displayed simultaneously with the same part associated with a different setting. Thus, related parts can be displayed simultaneously to provide different but corresponding information. In the example illustrated in FIG. 4, the sidebar 401 displays multiple instances of a weather part 402, 403. As shown in FIG. 4, a part 402 for the weather conditions in Chicago is displayed as well as a similar part 403 showing weather conditions in Portland. Each instance of the part can have its own unique settings, the respective settings indicating the desired location in this case. As seen in this example, the Chicago weather instance 402 of the weather part can store setting information specific for Chicago and display weather conditions in Chicago and the Portland weather instance 403 of the weather part stores setting information specific for Portland to display weather conditions in Portland.

A user can download the information from a web page in a variety of ways. In one example, the user can use a drag and drop protocol in which a user can select a part on a web page and drag the selected part to another location separate from the web page from where the element was dragged. A URL or address associated with the part can be displayed on the web page. The user can also drop the selected and dragged URL at the separate location to dock and instantiate the part onto the separate location. By instantiating the part onto the separate location, information associated with the part can be downloaded and stored locally and displayed.

The URL may be represented in any one of a variety of ways. For example, an icon, link, or thumbnail, or any other element associated with the part on the web page may be used instead of the URL.

The separate location may be any location that is separate from the web page. For example, the separate location may be a window of another application displayed on the computer desktop. In one example, the user can drag and drop the part from a web page to a sidebar application window which has settings in concordance with the settings of the URL such that the destination location can interpret and understand the URL. Settings associated with the part being downloaded locally can be stored locally. The sidebar application can be configured to dock parts when the setting of the sidebar application are compatible with that of the part being docked on the sidebar application. Alternatively, the element may be dragged to the desktop itself if the desktop also has settings that are compatible with that of the part being downloaded to the desktop and can interpret the URL of the part being downloaded. Similarly, any application can host a part if the application has settings compatible with that of the part being downloaded.

When a user drags the URL, or other display element corresponding to the part, onto a sidebar, for example, the system downloads files associated with the part and adds or instantiates the part on the sidebar as an instance of the part. The part can be associated with settings that describe the information desired to be displayed. The settings can be within the link or URL of the selected element and can be given to the downloaded instance of the part.

Figure 5A:
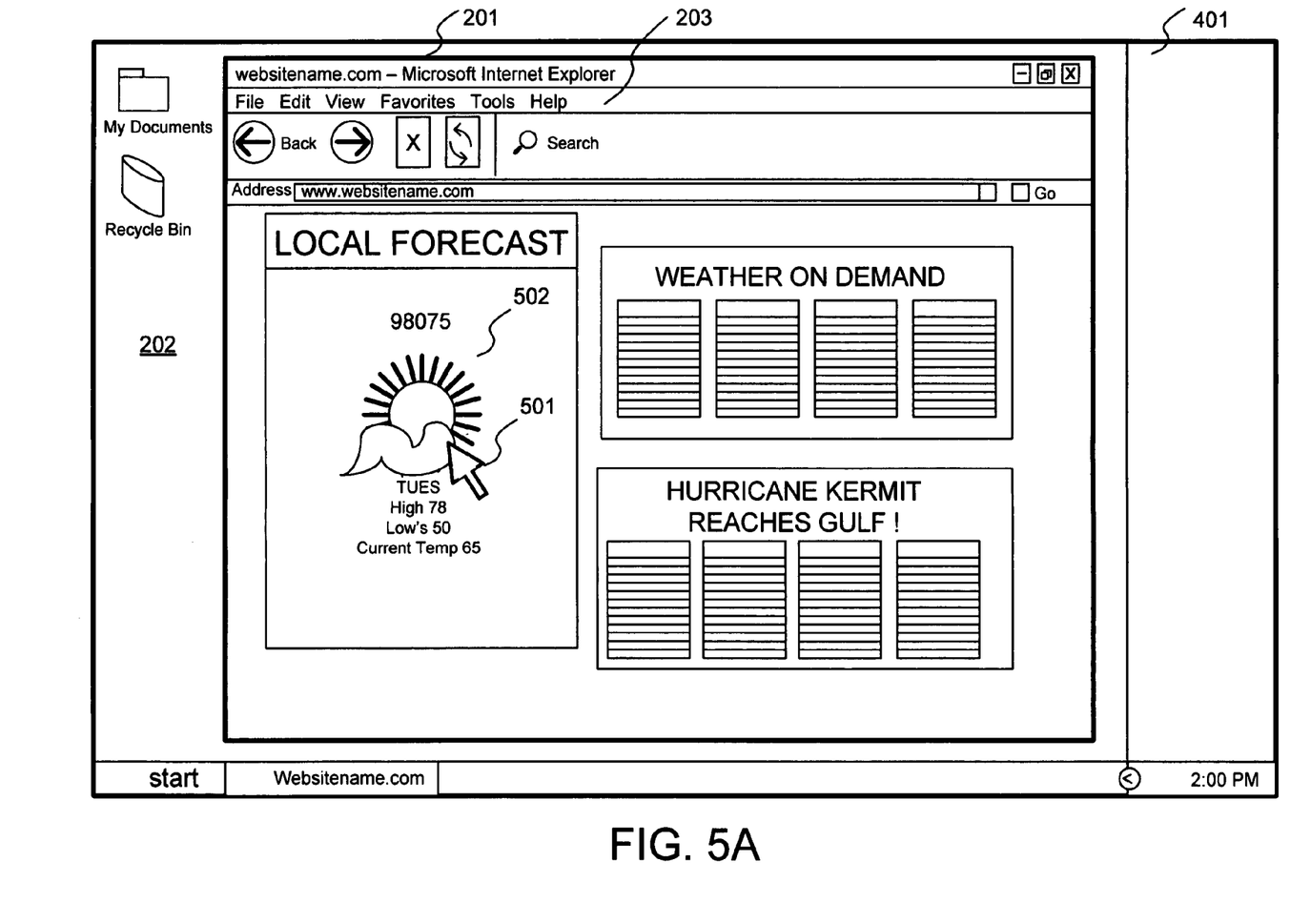
FIG. 5A illustrates an example of a web page containing a part and displayed on a computer desktop.
Figure 5B:
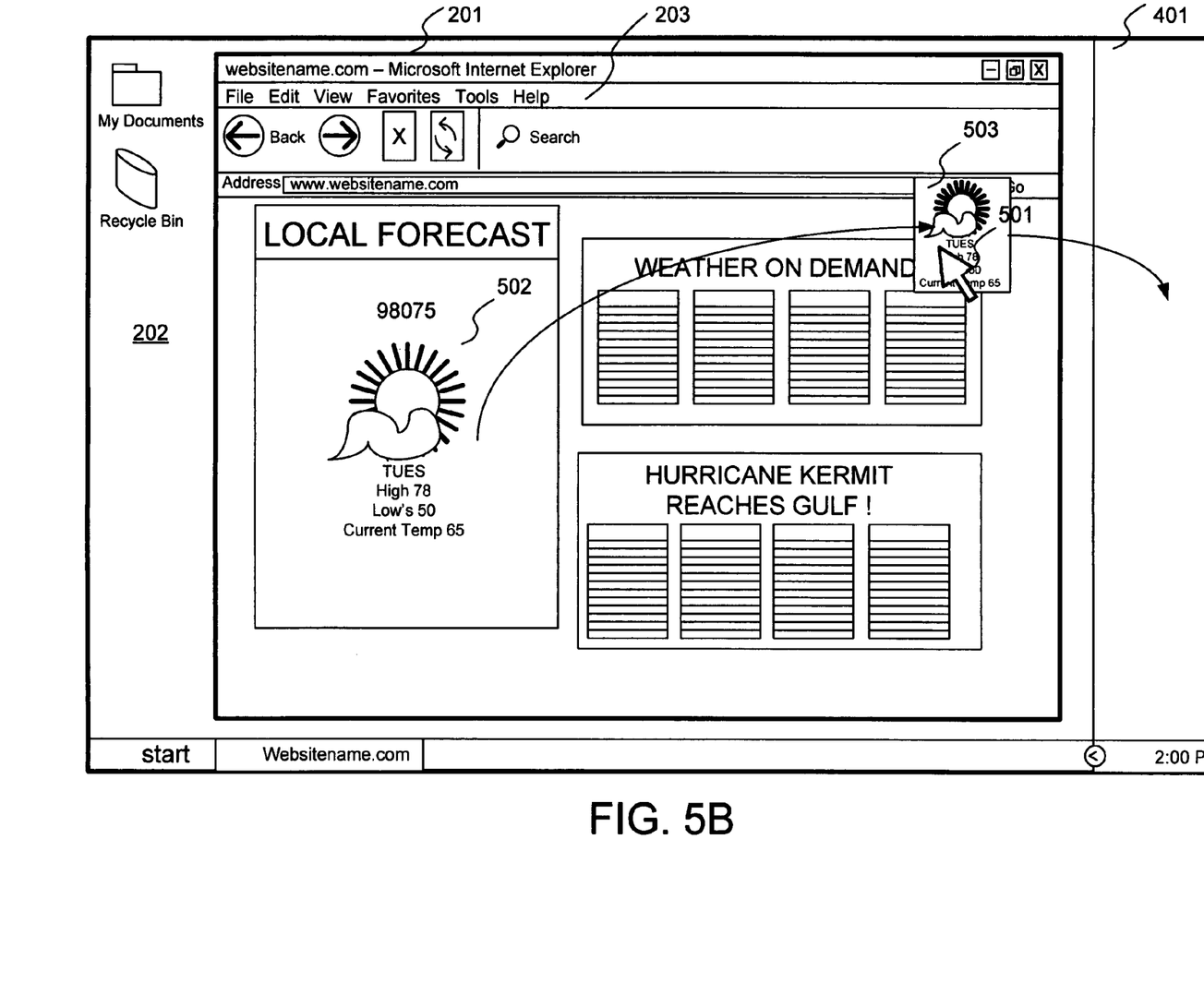
FIG. 5B illustrates an example of dragging a part from a web page toward a sidebar.
Figure 5C:
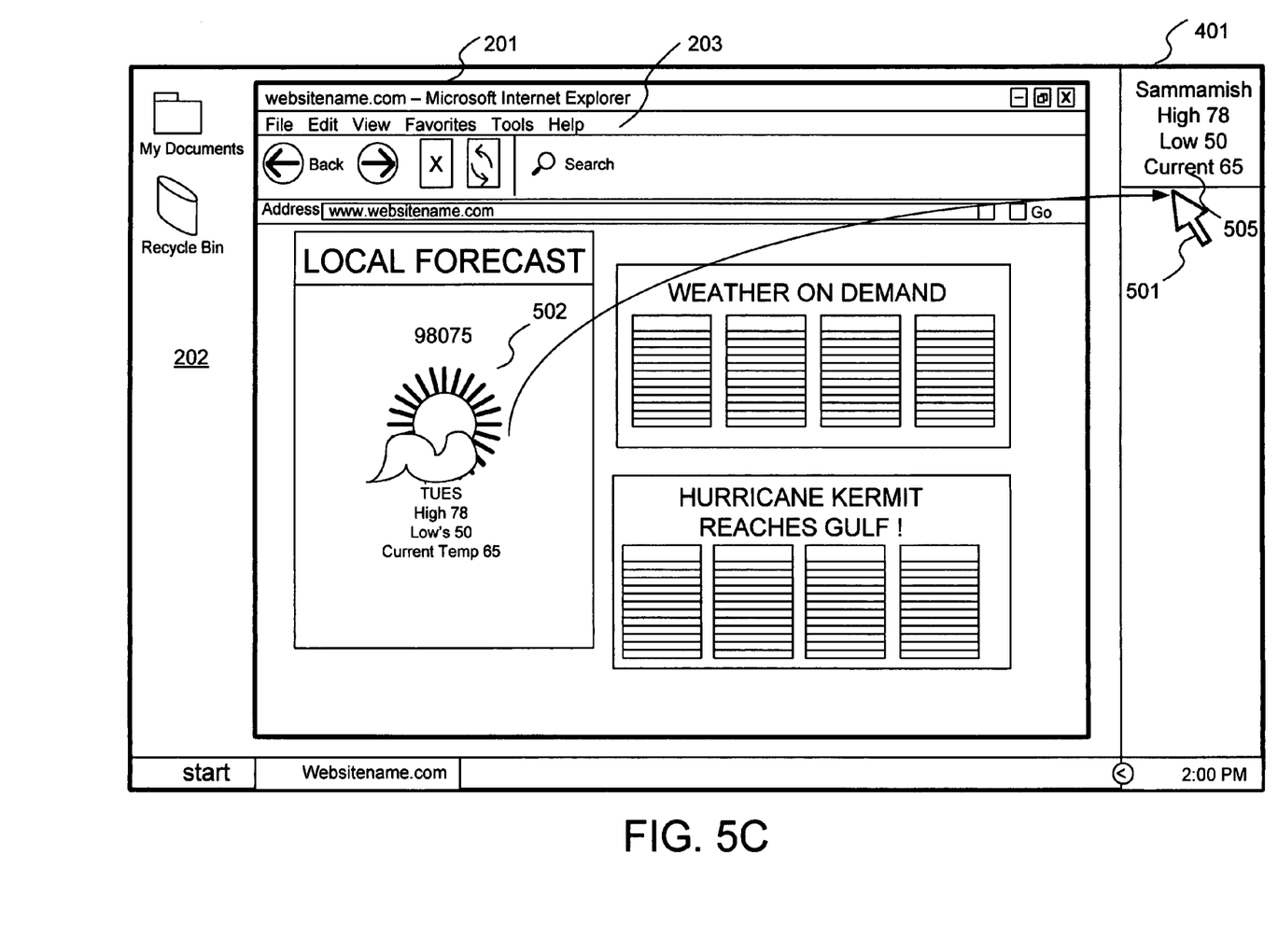
FIG. 5C illustrates an example of dragging and dropping a part from a web page onto a sidebar.

FIGS. 5A-5C illustrate an example of dragging and dropping a part from a web page onto a sidebar and instantiating the part onto the sidebar to provide desired information. In this example, a part 502 on a web page 201 and corresponding to weather conditions in the zip code of 98075 is displayed on a computer desktop 202 within the web page 201. The part 502 can be selected, for example by cursor 501, as illustrated in FIG. 5A.

In FIG. 5B, the part 502 is dragged from the original location on the web page 201 to an alternate location on the computer display. FIG. 5B shows the part 502 displaying weather conditions in the zip code of 98075 being dragged toward the sidebar 401. The part 502 is illustrated as a thumbnail 503 while being relocated to the sidebar 401, however, the appearance of the part 502 while being dragged can take any form. For example, part 502 can be displayed as an icon, a link, a URL, etc. Although the appearance of the part 502 can be represented by any display element, a URL or address underlies any such display element. The underlying address can point to a location from which files and other data associated with the part 502 can be downloaded. The address can also contain other information such as settings pertinent to an instance of the part 502.

FIG. 5C shows the part 502 dragged to the sidebar 401. The part 502 may display the corresponding weather information on the sidebar 401. For display of the desired information, the system copies files associated with the part 502 and downloads the files based on settings associated with the part 502. The system can instantiate the part 502 onto the sidebar 401 and display the part 505.

In one example, the part 502 can correspond to a URL link on the web page 202. One example of a generic representation of such a URL link may include a URL that includes a pointer or address to a package (i.e., files associated with the part) and parameters to indicate settings of the part. An element can separate the pointer or address to the package from the settings in the URL. Any element may be used to separate the package from the settings. For example a "#" may be inserted between the address to the package and the settings. Thus, in one example, a URL can take the general form of "package_address#settings".

Figure 6:
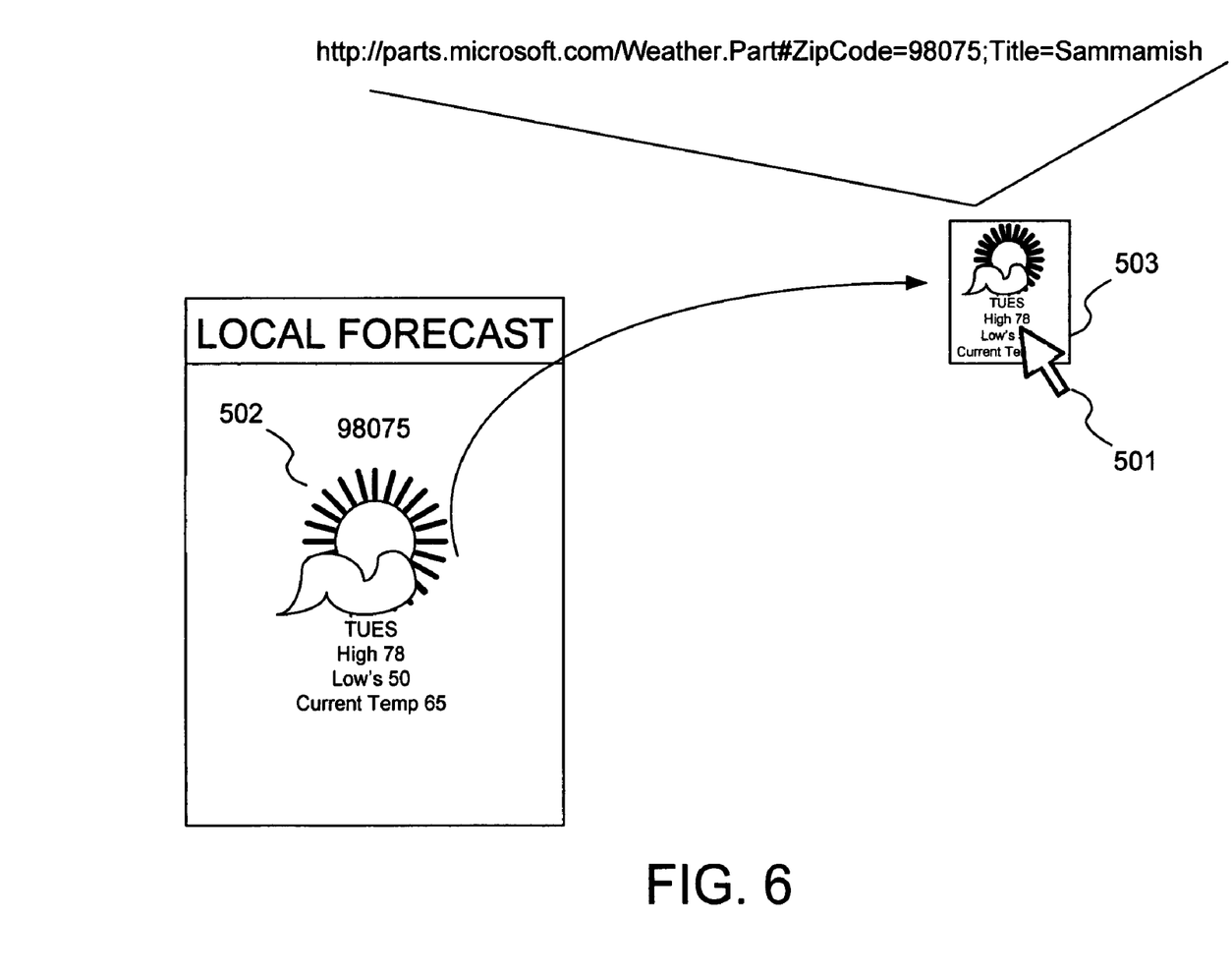
FIG. 6 illustrates an example of a URL containing an address to a package and a setting associated with a part.

FIG. 6 illustrates one example of such a link. In this example, URL contains an address to a package separated from the settings of a weather part by a "#" sign. The package in this example indicates files for displaying a part to provide weather information. Packages may be specific to a certain application so that there is a unique URL for each application. In this case, the the URL corresponds to a specific script or to specific user interface objects. The settings can be provided within the URL, as illustrated, and be associated with a corresponding package. In this example, the settings indicate a zip code (98075) and a title (Sammamish) after the hash mark (#). These settings can be applied to the package to customize the package to a particular desired configuration. Application of the setting in this example to the package provides weather information in the zip code of 98075 (Sammamish).

Figure 7:
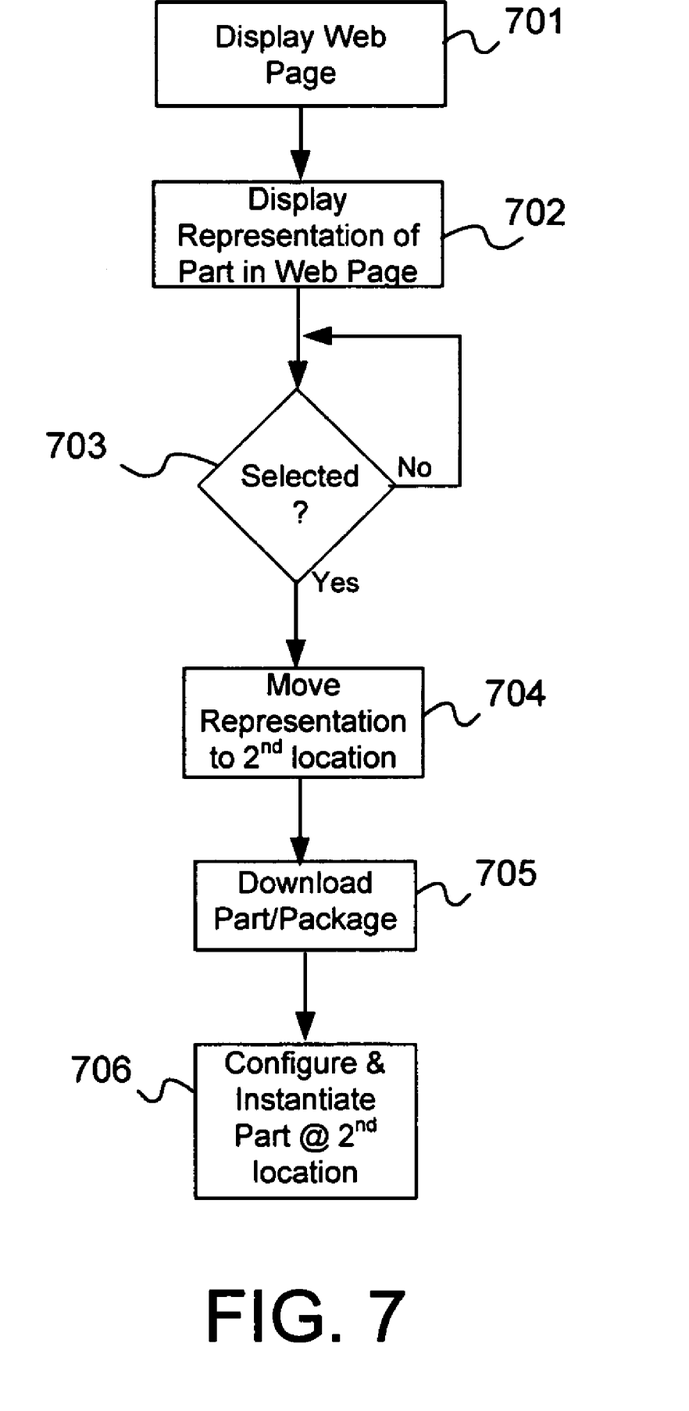
FIG. 7 is a flowchart illustrating an example in which information is displayed on a computer display.

FIG. 7 is a flowchart illustrating an example in which information is displayed on a computer display. In this example, a web page is displayed on a computer display (STEP 701), which can contain a representation of a part (STEP 702). Alternatively, the part can be displayed in any application or even on the desktop (not shown). A user can select the representation of the part in the web page (the "YES" branch of STEP 703), drag the representation from the current location (on the web page, in this example), and drop the representation at an alternate location that is away from the web page (STEP 704). Files associated with the part (i.e., the package) can be downloaded (STEP 705) so that the part can be configured and instantiated at the alternate or second location (STEP 706).

In one example, the representation of the part can be dragged from the web page to a location on the computer display that is separate from the web page and dropped onto the desktop. In another example, the representation of the part can be dragged from the web page and dropped onto an alternate location on the desktop, for example, on a sidebar. In yet another example, the representation of the part is dragged from any application and dropped on the desktop, sidebar, or other application.

The representation of the part can be any display element such as an icon or thumbnail. The representation can also be associated with a corresponding URL or address which can indicate the storage location of files associated with the part. The representation of the part can also be the URL or address itself. The URL can include segments separated by a predetermined separator such as a hash mark ("#"). The segments of the URL can include an address for a package of the part for indicating the location where files and/or script associated with the part can be found. The URL can also contain a segment for indicating the settings of an instance of the part.

When the representation of the part is dropped at the second location (e.g., on a sidebar), the system can locate files associated with the part based on an address provided in the URL of the representation and download the located files (i.e., the package) to instantiate the part at the second location in a configuration that is determined by settings. As set forth above, the settings can be contained within the representation of the part.

In any of these examples of displaying or moving a representation of a part, the part can be re-instantiated as a subsequent instance at a location on the display. For example, after instantiation of one instance of the part based on settings contained within a first representation of the part, the same part may be re-instantiated at a location on the display (e.g., at the same location on the display as the first instantiating or at another location on the display) as a second instance of the part based on settings contained within a second representation of the part. The settings of the first representation of the part may be different from the settings of the second representation of the part such that each instance of the part can be different.

Figure 8:
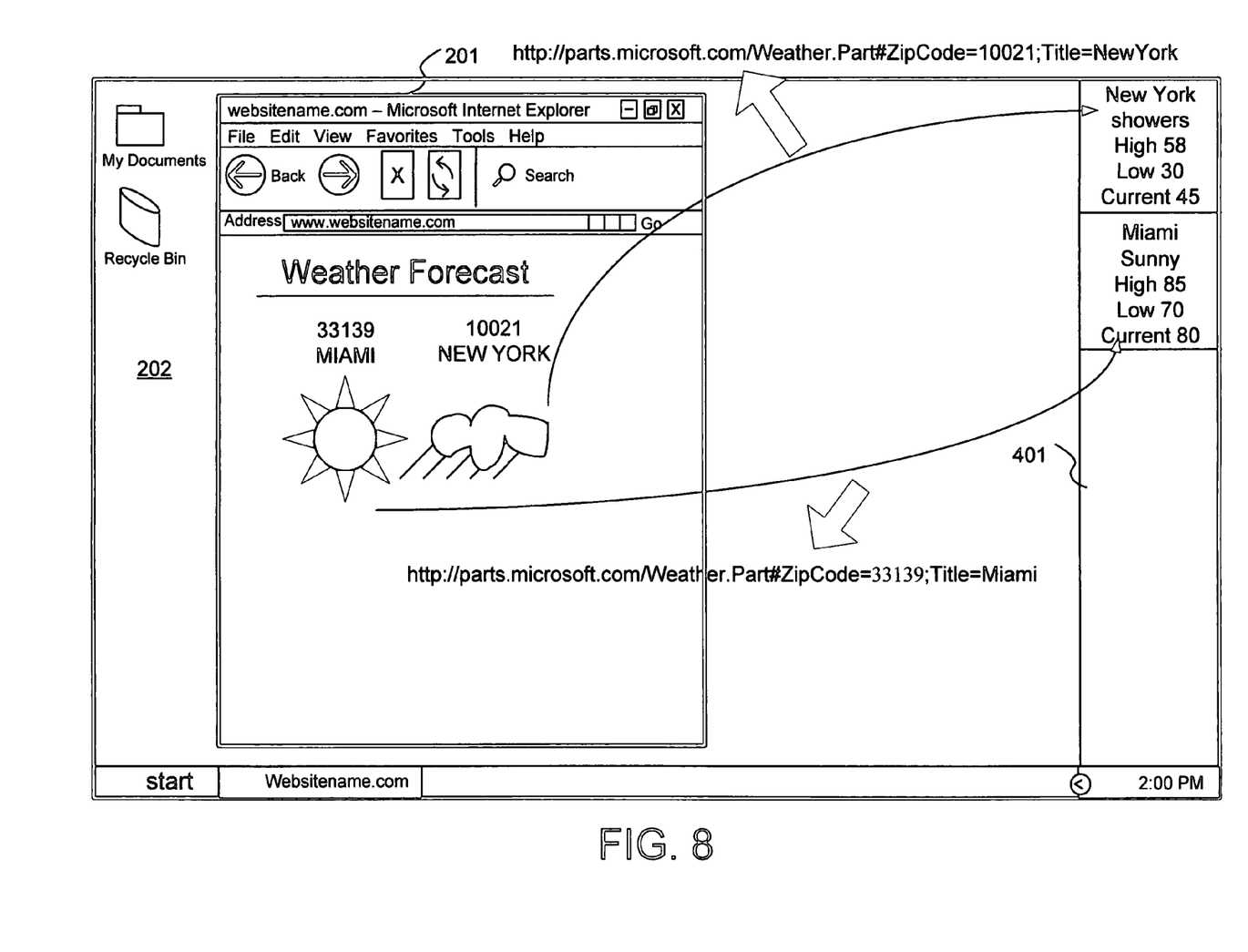
FIG. 8 illustrates an example of a web page displayed on a computer desktop and displaying multiple instances of a part on a sidebar.

FIG. 8 illustrates an aspect in which a web page 201 is displayed on a computer desktop 202 and multiple instances of a part are instantiated. A first representation of a weather part can be a weather report of New York (with associated settings to configure the instance of the part to provide weather information in New York) and a second representation of the weather part can be a weather report of Miami (with associated settings to configure the instance of the part to provide weather information in Miami). The first representation (in this example, a URL containing an address for a package corresponding to a weather part and settings corresponding to zip code 10021 and the city of New York) can be dragged from a first location within a web page 201 and dropped into a second location (such as a sidebar 401) that is outside or separate from the web page 201. If this is the first instance of the weather part, the files associated with the weather part (e.g., image files, UI objects, etc.—the package) can be downloaded from a remote location, then configured based on settings provided by the first representation. The part thus configured to provide weather information in New York can be instantiated at the second location.

The second representation (e.g., Miami weather part represented in this example by a URL containing an address for a package corresponding to a weather part and settings corresponding to zip code 33139 and the city of Miami) can then be dragged from a location within the web page 201 and dropped into the second location (sidebar 401). In this example, the files associated with the weather part (i.e., the package) have already been downloaded (when the package was downloaded and instantiated to provide New York weather information). Therefore, the package associated with the weather part need not be downloaded again. Rather, the package that was already downloaded can be reconfigured based on the settings associated with the representation of the New York weather part (to provide New York weather) and re-instantiated as a second instance to provide Miami weather information. Thus, in this example, more than one instance of a part is displayed.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

We claim:

1. In a computer system, a method of displaying information from a remote execution environment on a desktop display of a local computer, comprising:
   displaying a first representation of the information from the remote execution environment in a window on a display screen, the first representation corresponding to a first location identifier and a first setting associated with the remote execution environment, the first location identifier identifying a first location from which the remote execution environment can be obtained by the local computer;
   receiving a user selection of the first representation, the user selection comprising the user dragging the first representation to a predefined location on the display screen separate from the window;
   when the user drops the dragged first representation in the predefined location, downloading a package defining the information from the remote execution environment from the identified first location;
   installing the package; and
   instantiating the package based on the first setting, wherein information associated with the first setting is updated and persisted at the predefined location on the display screen.

2. The method of claim 1 wherein the remote execution environment includes one or more of the following: a web browser, a Terminal Services Desktop and a Virtual PC Desktop.

3. The method of claim 1 wherein the first location identifier and the first setting are defined by a Uniform Resource Locator (URL) corresponding to the first representation, said URL comprising a link to the package and at least one variable.

4. The method of claim 1 wherein the package includes files associated with the information from the remote execution environment.

5. The method of claim 1 wherein the package includes one or more of the following for producing the information: image files, a script files ZIP files, and CAB files.

6. The method of claim 1 wherein the first setting provides configuration data for the instantiating of the package.

7. The method of claim 1 wherein the first representation comprises a web page and the location identifier includes: a URL associated with the web page, an icon associated with the web page, a link associated with the web page, a thumbnail associated with the web page, and any other element associated with the web page.

8. The method of claim 1 wherein the package is instantiated by a sidebar application executing on the local computer.

9. The method of claim 1 wherein the first representation is displayed as the user drags the first representation in one or more of the following formats: a thumbnail, an icon, a link, and a URL.

10. The method of claim 9 wherein the dragged first representation includes an underlying URL and the underlying URL contains the first setting.

11. The method of claim 1 further comprising:
   receiving a user selection of a second representation of the remote execution environment, the second representation being displayed in the window on the display screen, the second representation corresponding to the first location identifier and a second setting associated with the remote execution environment, the user selection of the second representation comprising the user dragging the second representation to a predefined location on the display screen; and
   instantiating the package based on the second setting, wherein information associated with the second representation is updated and persisted at the predefined location on the display screen and wherein the information associated with second representation is different than the information associated with the first representation.

12. The method of claim 11 wherein the package is not downloaded from the identified first location based on receiving the user selection of the second representation.

13. The method of claim 1 further comprising:
   receiving a user selection of a second representation of the remote execution environment, the second representation being displayed in a second window on the display screen, the second representation corresponding to a second location identifier and a second setting associated with the remote execution environment, the second location identifier being different from the first location identifier, the user selection of the second representation comprising the user dragging the second representation to a predefined location on the display screen;
   in response to receiving the user selection of the second representation, downloading another package defining information related to the second representation from the remote execution environment from the identified second location;

installing the other package; and instantiating the other package based on the second setting, wherein information associated the second setting is updated and persisted at the predefined location on the display screen and wherein the information associated with the second representation is different than the information associated with the first representation.

14. In a computer system including a display, a method of displaying information from a web page in a sidebar of a desktop display, comprising:

displaying the web page in a browser on the desktop display, the browser including a first representation of the web page at a first location within the browser, the first representation corresponding to a first location identifier for identifying a first location from which the web page can be obtained by the computer system and a first setting associated with the web page;

receiving a user selection of the first representation, the user selection including a request for moving the first representation to a predefined location of the sidebar on the desktop display;

moving the first representation to the predefined location on the sidebar responsive to the receiving step, the sidebar being separate from the browser;

downloading a package from the location identified by the first location identifier, wherein the package includes files and computer code associated with displaying information related to the first representation of the web page; and instantiating the package by the sidebar application based on the first setting, wherein information related to the first representation of the web page is displayed in the sidebar.

15. The method of claim 14 wherein the first location identifier comprises an underlying URL associated with one of more of the following: a URL associated with the web page, an icon associated with the web page, a link associated with the web page, a thumbnail associated with the web page, and any other element associated with the web page.

16. The method of claim 14 wherein first setting provides configuration data to the sidebar application for the instantiating of the package.

17. The method of claim 14 wherein the first representation comprises one of more of the following: a URL associated with the web page, an icon associated with the web page, a link associated with the web page, a thumbnail associated with the web page, and any other element associated with the web page.

18. The method of claim 14 wherein the package instantiated by the sidebar application persists and updates the displayed information related to the first representation of the web page.

19. The method of claim 14 further comprising:

receiving a user selection of a second representation of the web page, the second representation being displayed in the browser, the second representation corresponding to the location identifier and a second setting associated with the web page, the user selection of the second representation comprising the user moving the second representation to a predefined location of the sidebar; and instantiating the package by the sidebar application based on the second setting wherein information related the second representation is displayed in the sidebar.

20. One or more computer storage media having computer-executable instructions for performing the steps comprising:

displaying a representation of the web page in a browser on a display screen of the desktop display, the representation of the web page corresponding to a location identifier and a setting associated with the web page, the location identifier identifying a location from which the web page can be obtained by the computer system;

receiving a user selection of the first representation of the web page, the selection comprising the user dragging the first representation the web page to the sidebar of the desktop display, wherein the sidebar is located at a predefined location on the display screen of the desktop display separate from the browser;

when the user drops the dragged representation of the web page in the predefined location, downloading a package defining display information of the web page from the identified location wherein the package includes files and computer code associated with display information of the web page;

installing the package; and instantiating the package based on the setting wherein the display information of the web page associated with the first representation is persisted and updated in the sidebar.

* * * * *